US007599885B2

(12) United States Patent
Johnson (10) Patent No.: US 7,599,885 B2
(45) Date of Patent: Oct. 6, 2009

(54) MANY-TO-MANY CORRESPONDENCE: METHODS AND SYSTEMS FOR REPLACING INTERBANK FUNDS TRANSFERS

(75) Inventor: Richard C. Johnson, Cupertino, CA (US)

(73) Assignee: Oracle Corporation, Redwood Shores, CA (US)

( * ) Notice: Subject to any disclaimer, the term of this patent is extended or adjusted under 35 U.S.C. 154(b) by 1057 days.

(21) Appl. No.: 10/240,366

(22) PCT Filed: Apr. 25, 2001

(86) PCT No.: PCT/US01/13307

§ 371 (c)(1),
(2), (4) Date: Mar. 25, 2003

(87) PCT Pub. No.: WO01/82193

PCT Pub. Date: Nov. 1, 2001

(65) Prior Publication Data

US 2003/0212641 A1 Nov. 13, 2003

(51) Int. Cl.
*G06Q 40/00* (2006.01)
(52) U.S. Cl. .......................................... 705/39; 705/35
(58) Field of Classification Search .................. 705/35, 705/39
See application file for complete search history.

(56) References Cited

U.S. PATENT DOCUMENTS

| 4,725,719 A | 2/1988 | Oncken |
| 4,903,201 A | 2/1990 | Wagner |
| 5,262,942 A | 11/1993 | Earle |
| 5,265,008 A | 11/1993 | Benton |
| 5,329,589 A | 7/1994 | Fraser et al. |
| 5,426,281 A | 6/1995 | Abecassis |
| 5,455,407 A | 10/1995 | Rosen |
| 5,590,197 A | 12/1996 | Chen |
| 5,644,727 A | 7/1997 | Atkins |
| 5,677,955 A | 10/1997 | Doggett |
| 5,694,471 A | 12/1997 | Chen |
| 5,784,463 A | 7/1998 | Chen |
| 5,790,677 A | 8/1998 | Fox |
| 5,794,207 A | 8/1998 | Walker |
| 5,812,670 A | 9/1998 | Micali |

(Continued)

FOREIGN PATENT DOCUMENTS

JP 09-150799 6/1997

(Continued)

OTHER PUBLICATIONS

Perry, Tekla S., *Electronic Money: Toward A Virtual Wallet*, IEEE Spectrum, Feb. 1997, pp. 18-20.

(Continued)

*Primary Examiner*—Jagdish N Patel
(74) *Attorney, Agent, or Firm*—Townsend and Townsend and Crew LLP (57) ABSTRACT

By establishing a correspondence account in each Financial Service Provider (FSP) of a group of FSPs and a secure inter-FSP messaging mechanism, transfers of funds entirely within member FSPs (FSP 1, FSP 2, FSP 3, FSP 4) may be combined with secure messaging to effectively transfer funds between buyers in one FSP (FSP 2) and sellers in another FSP (FSP 1) without actual transfer of funds between FSP's.

32 Claims, 2 Drawing Sheets

U.S. PATENT DOCUMENTS

| | | | |
|---|---|---|---|
| 5,845,265 A | | 12/1998 | Woolston |
| 5,848,400 A | * | 12/1998 | Chang .................. 705/35 |
| 5,898,777 A | | 4/1999 | Tycksen |
| 5,903,721 A | | 5/1999 | Sixtus |
| 5,974,146 A | * | 10/1999 | Randle et al. ............ 705/77 |
| 5,987,440 A | | 11/1999 | O'Neil |
| 6,029,150 A | | 2/2000 | Kravitz |
| 6,055,504 A | | 4/2000 | Chou |
| 6,076,074 A | | 6/2000 | Cotton et al. |
| 6,122,625 A | * | 9/2000 | Rosen .................. 705/65 |
| 2001/0034682 A1 | * | 10/2001 | Knight et al. ............ 705/35 |

FOREIGN PATENT DOCUMENTS

WO           WO 0014648 A1     9/1999

OTHER PUBLICATIONS

Kelley, Edward W. Jr., *The Future Of Electronic Money: A Regulator's Perspective*, IEEE Spectrum, Feb. 1997, pp. 21-22.

Sirbu, Marvin A., *Credits And Debits On The Internet*, IEEE Spectrum, Feb. 1997, pp. 23-29.

Chaum, David and Brands, Stefan, *Minting Electronic Cash*, IEEE Spectrum, Feb. 1997, 30-34.

Gemmell, Peter S., *Traceable E-Cash*, IEEE Spectrum, Feb. 1997, pp. 35-37.

Morris, Stanley E., *Crime And Prevention: A Treasury Viewpoint*, IEEE Spectrum, Feb. 1997, pp. 38-39.

Baldwin, Robert W. and Chang, C. Victor, *Locking The E-Safe*, IEEE Spectrum, Feb. 1997, pp. 40-46.

Hovenga Fancher, Carol, *In Your Pocket: Smartcards*, IEEE Spectrum, Feb. 1997, pp. 47-53.

McChesney, Michael C., *Banking In Cyberspace: An Investment In Itself*, IEEE Spectrum, Feb. 1997, pp. 54-59.

Wallman, Steven M.H., *Technology Takes To Securities Trading*, IEEE Spectrum, Feb. 1997, pp. 60-65.

Berkely, Alfred R. III, *Nasdaq 's Technology Floor: Its president Takes Stock*, IEEE Spectrum, Feb. 1997, pp. 66-67.

Ter Maat, Mike, *The Economics of E-Cash*, IEEE Spectrum, Feb. 1997, pp. 69-73.

Anon2u.com, *The Way To Avoid Divulging Personal Or Financial Information To Multiple Websites While Shopping Online*, p. 1, World Wide Web http://www.anon2u.com/ (Printed on Apr. 26, 2001).

Anon2u.com, *The Service Options We Offer*, p. 1, World Wide Web http://www.anon2u.com/ (Printed on Apr. 26, 2001).

Hiatt, John T., *"Point-and-Click Time-and-Bill"*, Computers in Accounting, vol. 8, No. 6, pp. 54-56, Aug. 1992.

Goizueta Business School, *Secure Electronic Transaction (Set)*, Fall 1997, World Wide Web http://www.emory.edu/business/et/set (Printed on Apr. 28, 1999).

Identrus, *The Identrus Solution—How Identrus Works*, World Wide Web, http://identrus.com/structurehome.htm (Printed on Jan. 19, 2001).

Identrus, *The Identrus Solution—FAQ*, World Wide Web, http://www.identrus.com/solutionfaq.htm (Printed on Jan. 19, 2001).

C/Net news.com, http://www.news.com/, "AT&T sues eBay, PayPal over patent", Jan. 21, 2004.

* cited by examiner

MANY-TO-MANY CORRESPONDENCE: METHODS AND SYSTEMS FOR REPLACING INTERBANK FUNDS TRANSFERS

BACKGROUND OF THE INVENTION

1. Cross Reference to Related Applications

The subject matter of the present application is related to the subject matter disclosed in co-pending and commonly assigned U.S. patent application Ser. No. 09/272,056, entitled "Methods And Systems For Single Sign-On Authentication In A Multi-Vendor E-Commerce Environment And Directory-Authenticated Bank Drafts" filed on Mar. 18, 1999; Ser. No. 09/405,741, entitled "Methods And Systems For Carrying Out Directory-Authenticated Electronic Transactions Including Contingency Dependent Payments Via Secure Electronic bank Drafts" filed on Sep. 24, 1999; Ser. No. 09/490,783, entitled "eDROPSHIP: Methods And Systems For Anonymous E-Commerce Shipment" filed on Jan. 24, 2000, and Ser. No. 10/071,066, filed on Apr. 12, 2002 entitled "Methods And Systems For Carrying Out Contingency-Dependent Payments Via Secure Electronic Bank Drafts Supported By Online Letters Of Credit And/Or Online Performance Bonds", the disclosures of which are hereby incorporated herein in their entirety.

2. Field of the Invention

The present invention relates to methods and systems for low cost and high-speed transfers of funds between bank accounts and the accounts of buyers and sellers.

3. Description of the Related Art

Inter-bank transfers are expensive when carried out on a per-transaction basis. These costs are not significantly reduced even when the processing of such transfers is carried out on a batch basis. This is true whether the funds are transferred by clearing credit card charges or when transferring money through the ACH (Automated Clearing House) network or other networks used by financial institutions to move money and information around. Not only are inter-bank transfers expensive, but they are also slow. High cost is only one problem associated with traditional inter-bank transfers; the long delay inherent in executing such transfers is another. Although most current Electronic Funds Transfers (EFT) are usually executed in a single day, this falls far short of "Internet Time", in which transfers of money and information must flow in real time, as transactions are executed and information exchanged.

What are needed, therefore, are methods and systems for decreasing both the cost and delay traditionally associated with the transfer of funds between banks.

SUMMARY OF THE INVENTION

It is, therefore, an object of the present invention to provide methods and systems for decreasing both the cost and delay traditionally associated with the transfer of funds between Financial Service Providers (FSPs).

In accordance with the above-described objects and those that will be mentioned and will become apparent below, the present invention is a method of transferring a payment to a seller having an account at a first FSP from a buyer having an account at a second FSP, the first FSP owning a first account at the first FSP and the second FSP owning a second account at the second FSP. The method may include steps of establishing a second correspondence account at the second FSP, the second correspondence account being owned by the first FSP; debiting the payment from the buyer's account and correspondingly crediting the payment to the second account; debiting the payment from the second account and correspondingly crediting the payment to the second correspondence account, and sending a secure message to the first FSP, advising the first FSP that the payment has been transferred to the second correspondence account and requesting that funds corresponding to the transferred payment be credited to the seller's account.

The first FSP may carry out a step of debiting the payment from the first account and correspondingly crediting the seller's account upon receipt of the message. A step of establishing a first correspondence account at the first FSP, the first correspondence account being owned by the second FSP may also be carried out. The method may also include a step of receiving an acknowledgment from the first PSP, the acknowledgment at least indicating receipt of the secure message by the first FSP and/or indicating that the payment has been credited to the seller's account. A fee may be assessed from the buyer, the seller, the first FSP and/or the second FSP, for example. The buyer's account and/or the seller's account may include, may be or may be tied to a credit, debit, bank or payment card, for example.

The present invention is also a method of transferring a payment to a seller having an account at a first FSP from a buyer having an account at a second FSP, comprising steps of establishing a second correspondence account at the second FSP, the second correspondence account being owned by the first FSP; debiting the payment from the buyer's account and correspondingly crediting the second correspondence account, and sending a secure message to the first FSP, advising the first FSP that the payment has been transferred to the second correspondence account and requesting that funds corresponding to the transferred payment be credited to the seller's account.

The first FSP may own a first account at the first FSP and may carry out a step of debiting the payment from the first account and correspondingly crediting the payment to the seller's account upon receipt of the secure message. A step of establishing a first correspondence account at the first FSP may also be carried out, the first correspondence account being owned by the second FSP. An acknowledgment may be received from the first FSP, the acknowledgment indicating receipt of the secure message by the first FSP and/or that the seller's account at the first FSP has been correspondingly credited, for example. A fee may be assessed from the buyer, the seller, the first FSP and/or the second FSP, for example. The buyer's account and/or the seller's account may include, may be or may be tied to a credit, debit, bank and payment card, for example.

The present invention may also be viewed as a method of transferring a payment to a seller having an account at a first FSP from a buyer having an account at a second FSP, the second FSP owning a second account at the second FSP. The method may include steps of establishing a first correspondence account at the first FSP, the first correspondence account being owned by the second FSP; debiting the payment from the buyer's account and correspondingly crediting the payment to the second account, and sending a secure message to the first FSP, advising the first FSP to debit the payment from the first correspondence account and correspondingly credit the payment to the seller's account.

A second correspondence account may be established at the second FSP, the second correspondence account being owned by the first FSP. The first FSP further may carry out a step of debiting the payment from the first correspondence account and correspondingly crediting the payment to the seller's account upon receipt of the message. An acknowledgment may be received from the first FSP, the acknowledgment at least indicating receipt of the secure message by the first FSP and/or that the seller's account has been correspondingly credited. A fee may be assessed from the buyer, the seller, the first FSP and/or the second FSP. The buyer's account an/or the seller's account may include, may be or may be tied to a credit, debit, bank and payment card (or other forms of electronic money), for example.

The present invention is also a method of transferring a payment through an FSP to a seller having an account at a first FSP from a buyer having an account at a second FSP, the FSP maintaining a first account for the first FSP and a second account for the second FSP, comprising the steps of debiting the payment from the buyer's account; sending a first secure message to the FSP, instructing the FSP to debit the payment from the second account and correspondingly credit the payment to the first account; receiving a second secure message from the first FSP, advising the second FSP that the payment has been transferred to the seller's account.

The FSP further may carry out a step of securely notifying the first FSP of the crediting of the payment to the first account. The first FSP may carry out a step of crediting the payment to the seller's account and sending the second secure message to the second FSP. The FSP may include a Central National Bank or the Federal Reserve Bank (in the case wherein the FSP is located in the United States), for example. Alternatively, the FSP may include an issuer of a credit, debit, bank and payment card, for example. The method may further include a step of assessing a fee from the buyer, the seller, the first FSP and/or the second FSP. The buyer's account and/or the seller's account may include, may be or may be tied to a credit, debit, bank and payment card, for example.

The present invention may also be viewed as a method for an organization (such as a credit card company, bank, etc.) to intermediate between a buyer transferring a payment from a buyer account at a first FSP to a seller account at a second FSP, the FSP maintaining a first account for the first FSP and a second account for the second FSP, comprising the steps of receiving a first secure message from a first FSP, the first secure message instructing the FSP to debit the payment from the first account and correspondingly credit the payment to the second account; after receiving the first secure message, debiting the payment from the first account and correspondingly crediting the payment to the second account, and sending a second secure message to the second FSP, advising the second FSP of the crediting of the payment to the second account and instructing the second FSP to correspondingly credit the payment to the seller's account.

The present invention, according to another embodiment thereof, is a method for a card issuing company to transfer a payment from a buyer having a buyer account at a first FSP to a seller having a seller account at a second FSP, each of the first and second FSPs maintaining a correspondence account for the card issuing company, comprising the steps of debiting the payment from the buyer account and correspondingly crediting the payment to the card issuing company's correspondence account at the first FSP; sending a first secure message to the second FSP, the secure message advising the second FSP that the payment has been credited to the card issuing companys correspondence account at the first FSP; receiving a second secure message from the second FSP, the second secure message advising the first FSP that the payment has been debited from the card issuing company's correspondence account at the second FSP and credited to the seller account.

According to still another embodiment thereof, the present invention is a method for a card issuing company to transfer a payment from a buyer having a buyer account at a first FSP to a seller having a seller account at a second FSP, each of the first and second FSPs maintaining a correspondence account for the card issuing company, comprising the steps of receiving a first secure message from the first FSP, the secure message indicating that the payment has been debited from the buyer account and credited to the card issuing company's correspondence account in the first FSP; responsive to receiving the first secure message, debiting the payment from the card issuing company's correspondence account in the second FSP and correspondingly crediting the payment to the seller account, and sending a second secure message to the first FSP, the secure message advising the first FSP that the payment has been credited to the seller account.

DESCRIPTION OF THE INVENTION

The present invention may be implemented independently of the iDraft™ and eDropShip™ systems disclosed in the above-listed U.S. patent applications, although enhanced functionality may be achieved if the systems and methods disclosed herein are utilized in conjunction with the present invention.

Figure 1:
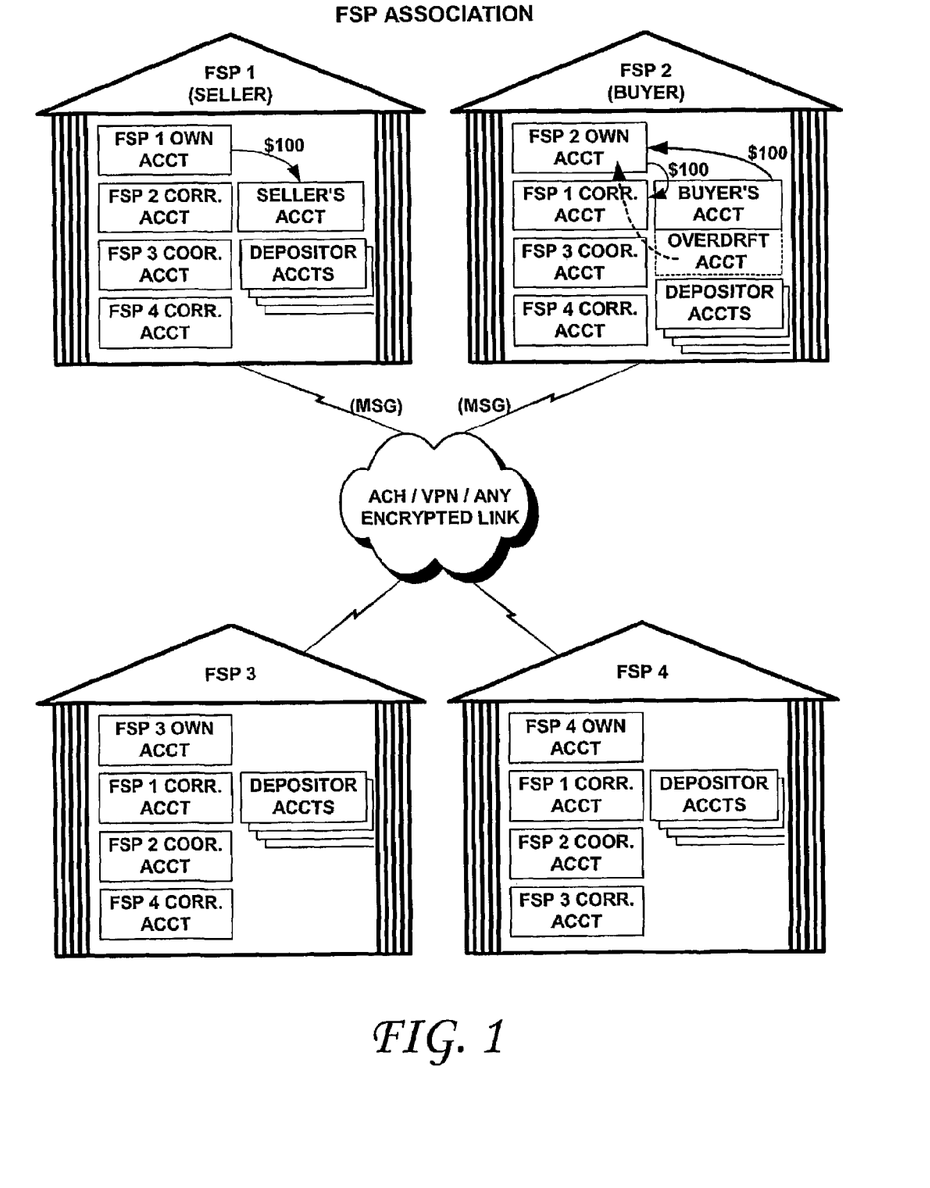
FIG. 1 is a block diagram of a system and method for carrying out inter-FSP funds transfers, according to an embodiment of the present invention.

An embodiment of the present invention is shown in FIG. 1. FIG. 1 shows a plurality of FSPs (of which only four are shown in FIG. 1), labeled FSP1, FSP2, FSP3 and FSP4. Within the context of the present invention, the term "FSP" shall be understood to include all financial services institutions accepting deposits of cash, negotiable securities, marketable shares/stock into numbered (or otherwise uniquely-identified) accounts and honoring checks, drafts and/or other customer instructions, given that such institutions know their clients within the meaning of relevant U.S. and other banking regulations. Such a definition includes (but is not limited to) traditional banks and savings institutions, stockbrokers, online trading concerns, credit unions and any institution that legally identifies with and has some financial relationship with an account holder and that has the ability to honor customer or account holder instructions referring to specific accounts. Each of the FSPs of FIG. 1 holds a plurality of depositor accounts DEPOSITOR ACCTS and one or more accounts owned by the FSP itself. For example, the account owned by FSP1 is identified in FIG. 1 as FSP1 OWN ACCT. Likewise, the account owned by FSP2 is shown in FIG. 1 as FSP2 OWN ACCT, that of FSP3 as FSP3 OWN ACCT and the account owned by FSP 4 is shown as FSP4 OWN ACCT.

In addition, each of the FSPs FSP1, FSP2, FSP3 and FSP4 may form part of an association, called "FSP ASSOCIATION" in FIG. 1 for convenience. The FSP ASSOCIATION may include a standard setting body and a body that regulates membership in the association, as well as polices the behavior of the member FSPs, to insure compliance with membership guidelines as well as compliance with all applicable federal and state banking laws. Each of the member FSPs of the FSP ASSOCIATION, according to the present invention, also includes a correspondence account for each of the other FSPs of the FSP ASSOCIATION. Indeed, FSP1 includes a correspondence account for each of the FSPs FSP2, FSP3 and FSP4, labeled as FSP2 CORR. ACCT, FSP3 CORR. ACCT and FSP4 CORR. ACCT, respectively. Likewise, the correspondence accounts held by FSP FSP2 include FSP1 CORR. ACCT, FSP3 CORR. ACCT and FSP4 CORR. ACCT. Similarly, the correspondence accounts held by FSPs FSP3 and FSP4 include FSP1 CORR. ACCT, FSP2 CORR. ACCT, FSP4 CORR. ACCT and FSP1 CORR. ACCT, FSP2 CORR. ACCT, FSP3 CORR. ACCT, respectively. Each FSP, therefore, holds a correspondence account for each of the other FSPs in the FSP ASSOCIATION. The correspondence accounts are accounts that are owned by the correspondence and held by other FSPs. Thus, there is a Many-To-Many correspondence relationship among the several FSPs. Some of these correspondence accounts may remain dormant, with zero balances. Some of the correspondence accounts, however, may allow the rapid and inexpensive transfer of funds between member FSPs. That is, using the correspondence accounts according to the present invention, funds may be transferred from a buyer's account at one FSP to the seller's account at another FSP at what is believed to be nearly the lowest attainable cost.

Suppose now, for purposes of illustration, that FSP FSP1 is the seller's FSP (the FSP in which the seller maintains an account) in some transaction for the sale of goods and/or services and that the FSP FSP2 is the buyer's FSP (the FSP in which the buyer maintains an account) for that same transaction. The seller, therefore, maintains an account at FSP1 (called SELLER'S ACCT in FIG. 1) and the buyer maintains an account at FSP2 (called BUYER'S ACCT in FIG. 1). According to the present invention, payment on a transaction may be made without any money (electronic or otherwise) flowing between the buyer's and seller's FSPs; that is, from BUYER'S ACCT in FSP2 to SELLER'S ACCT in FSP1. Indeed, according to an embodiment of the present invention, when payment on a transaction (an iDraft™ transaction, for example) is to be made, money should flow from the buyer's account to the seller's account. That is, money should be debited from BUYER'S ACCT in FSP2 and be credited to SELLER'S ACCT in FSP1.

To do this according to the present invention without causing money to flow between FSP1 and FSP2, the buyer's FSP FSP2 may debit (with the buyer's preauthorization) an amount of money at least equal to payment on the transaction (say $100) from the buyer's account BUYER'S ACCT and transfers it into its own account FSP2 OWN ACCT. Thereafter, FSP2 may transfer the $100 from FSP2 OWN ACCT into the correspondence account for FSP1. Therefore, there has now been an intra-FSP transfer of funds entirely within FSP2 at least equal to the payment for the transaction. The buyer has performed, in that an appropriate sum (in this case, $100) has been debited from its account BUYER'S ACCT for payment on the goods and/or services underlying the transaction between the buyer and seller. Now, instead of FSP2 transferring $100 to FSP1 (through ACH, for example), FSP2 may send FSP1 a secure message (referenced in FIG. 1 as the cloud bearing the legend ACH/VPN (Virtual Private Network)/Any Encrypted Link indicating that funds at least equal to the amount of purchased goods or services have been transferred by the buyer's FSP FSP2 to the seller's FSP's correspondence account FSP1 CORR. ACCT at the buyer's FSP FSP1. Having received this secure, (encrypted, for example) message from the buyer's FSP FSP2, the seller's FSP FSP1 may now transfer $100 (in this example) from its own account FSP1 OWN ACCT into the seller's account at FSP1, namely, SELLER'S ACCT. In one advantageous embodiment, the message is sent by software at FSP2 and is configured to be read by software at FSP1, without human intervention. The seller has now received the benefit of the bargain; namely, payment for the goods and/or services transferred to buyer. Money, therefore, has effectively flowed from the buyer's account BUYER'S ACCT at FSP2 to the seller's account SELLER'S ACCT at FSP2 without any actual transfer of funds between the two FSPs.

Such transactions may occur many times during the course of a single day. Each FSP within the FSP ASSOCIATION may decide when and whether to transfer the funds on deposit in their correspondence accounts at other FSPs back to them or may move funds in any manner permitted by normal electronic banking operations. As the correspondence accounts may be interest-bearing accounts, funds on deposit therein need not lie dormant. Should any FSP wish to transfer funds it has on deposit in its correspondence account at another FSP, it may do so via ACH, for example, at the end of the day or at any time and in any manner, as known to those of skill in this art. In this manner, a single inter-FSP transfer (carried out at the transferor FSP's convenience), may collect the proceeds of many individual transactions, thereby allowing further economies of scale.

The practical result of the present invention is very close to an instantaneous transaction from the buyer and seller's point of view, executed through the agency of their respective FSPs. The cost of moving money intra-FSP from one account to another is very low. Further reduction in expense comes from the inherent balancing of buyer and seller transactions where, as in FIG. 2, the correspondence account is used to fund a transaction within the buyer's or seller's FSP. Thus, transaction savings are produced and delays in payment greatly reduced. The present invention requires that FSPs act on the payment advice they receive as secure messages describing the transactions and that the seller's FSP transfers funds into the seller's account based upon the received payment advice.

According to the present invention, the secure message between the FSPs may include some or all of the following information:

An identification of the buyer sufficient to authenticate the buyer to the satisfaction of the buyer's FSP;

An identification of the seller sufficient to authenticate the seller to the satisfaction of the seller's FSP;

An identification of the buyer's FSP;

An identification of the seller's FSP;

An amount to be transferred from the buyer to the seller and

A unique reference number or other unique transaction identifier.

The secure message, for example, may be formatted in Extendible Markup Language (XML).

Fees may be levied at each or selected stages of the above-described processing of the payment on the transaction. For example, the fees associated with the payment may be entirely borne by the seller, or may be apportioned between the buyer and the seller, according to a preexisting agreement. In the case wherein the fees are borne entirely by the seller, a portion of the fees may be deposited in the seller's FSP's own account (FSP1 OWN ACCT in FIG. 1) and another portion of the fees levied from the seller may be deposited in the buyer's FSP's own account (FSP2 OWN ACCT in FIG. 1). Permutations of the above are possible, by agreement between the FSPs. The fees assessed may be low, benefiting the buyer, whereas the present invention benefits the seller by providing near instantaneous payment thereto.

One of the paradoxes of modern credit is that FSPs profit little from their best customers; i.e., those that are in the best financial condition and those that do not regularly use revolving credit. FSPs may even lose money on customers that pay their credit card bill in full every month. The present invention allows FSPs to levy a small fee and generate revenue for each transaction carried out on behalf of their very best customers (and all customers who use this service), thereby mitigating the effect of providing such customers with free credit and/or other forms of deferred payment services. Moreover, the buyer, by virtue of the near instantaneous payment to the seller, may negotiate a smaller price for the goods and/or services underlying the transaction.

Receipts may be generated for both the buyer and seller to provide a record of the execution of the transaction and the transfer of funds between the parties thereto. Moreover, the unique reference number may provide a convenient instrument with which to query the FSPs' database records, to obtain historical data relating to the payment, either for the FSPs' own purposes, for law enforcement or other purposes, for example. Transactional anonymity may be assured, as the buyer may be authorized to query the FSPs' records based upon the unique reference number, whereas the seller (who only has the right to receive money) need only learn the identity of the buyer's FSP or an alias thereof.

The cost of transferring funds in this manner is believed to be substantially lower than the cost of transferring money between FSPs in the conventional manner. Indeed, if the cost of transferring money between accounts within a single FSP is denoted by LC (Lowest Cost) and the cost of generating, sending and receiving the secure message between the FSPs is denoted by CM (Cost of Message), then TC (the Total Cost of transferring money from the buyer's account to the seller's account) may be approximated by the equation $TC=(2 \times LC)+CM$, which may the lowest attainable cost for a two FSP transaction. For transaction involving n FSPs, the equation becomes $TC=(n \times LC)+(n \times CM)$.

Each of the buyer and seller's accounts may be coupled to an overdraft protection account, as shown in dashed lines in FSP2. In that case, the intra-FSP transfers may actually take place between the FSPs' own accounts and the parties' overdraft accounts.

Figure 2:
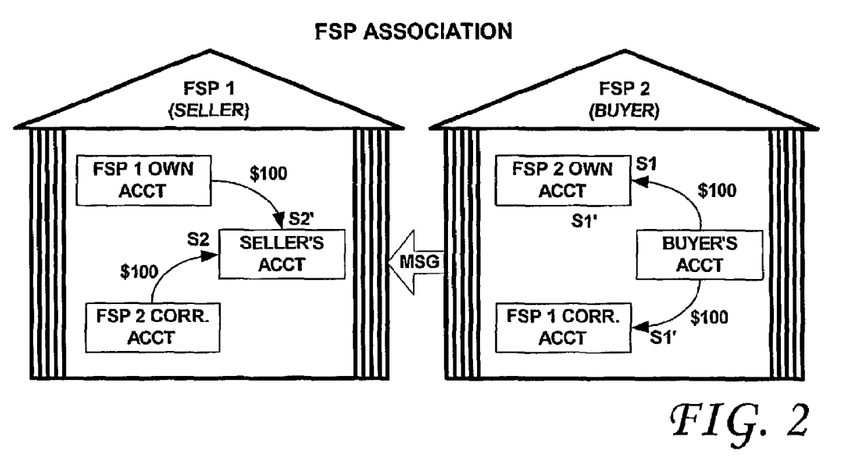
FIG. 2 is a block diagram of additional systems and methods for carrying out inter-FSP funds transfers, according to another embodiment of the present invention.

FIG. 2 shows additional embodiments of the present invention. FSP3 and FSP4 have been omitted for clarity of illustration, as has been the cloud representing the secure link through which inter-FSP messaging occurs according to the present invention. Also omitted from FSP1 and FSP2 are the respective depositor accounts, as well as the correspondence accounts FSP3 CORR. ACCT and FSP4 CORR. ACCT, again for clarity of illustration. As shown in FIG. 2, to effectuate payment between the buyer and seller, the buyer may transfer or cause to be transferred the amount corresponding to the purchase of the goods and/or services ($100 in the current example) from the BUYER'S ACCT to the buyer's FSP's own account FSP2 OWN ACCT, as shown in step S1. FSP2 may then generate a secure, (encrypted, for example) message to FSP1, advising FSP1 of the transfer and other details of the transaction and instructing and authorizing FSP1 to transfer a corresponding amount ($100) from FSP2's correspondence account FSP2 CORR. ACCT in FSP1 directly into the seller's account SELLER'S ACCT in FSP1. Again, funds were transferred between buyer and seller without any transfer of funds between the FSPs at which the buyer and seller maintain their accounts. Alternatively, funds may be transferred directly from BUYER'S ACCT to FSP1's correspondence account FSP1 CORR. ACCT at FSP2, as shown at step S1'. Thereafter, a secure, (encrypted, for example) message may be generated by FSP2, advising FSP1 of the transfer and of other details of the transaction, and requesting and authorizing that FSP1 correspondingly credit SELLER'S ACCT from its own account FSP1 OWN ACCT, as shown at S2'. In all cases, one or more secure (encrypted, for example) acknowledgment messages may be sent back to the FSP that originated the first message. The acknowledgement message (s) may include an acknowledgement of receipt of the first message and/or confirmation that the requested funds transfers have indeed taken place.

Figure 3:
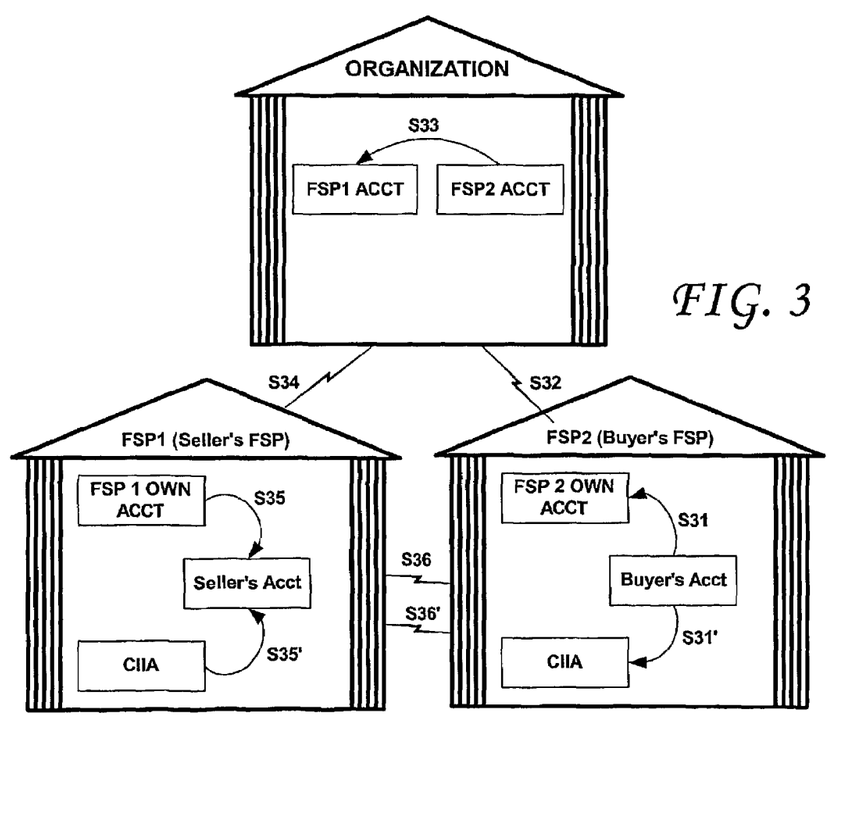
FIG. 3 is a block diagram of another system and method for carrying out inter-FSP funds transfers, according to another embodiment of the present invention.

As shown in FIG. 3, the correspondence accounts need not be maintained by the FSPs themselves. Indeed, the correspondence accounts for FSP1 and FSP2 may be held by an organization such as a credit card company, a bank or some other FSP. According to one embodiment of the present invention, the organization may include the United States Federal Reserve Bank system (hereafter, FRB). In other countries, the organization of FIG. 3 may be that country's Central National Bank. In the United States, the FRB already maintains accounts for all of the major and most of the minor FSPs in the United States and is able to transfer money between these accounts as authorized by the associated FSPs. According to this embodiment of the present invention, these FRB accounts serve as proxies for the correspondence accounts described relative to FIGS. 1 and 2. his embodiment of the present invention further reduces the cost of maintaining the Many-To-Many relationship described herein, because it is the FRB (or other Central National Bank) and not the individual FSPs that maintains the correspondence accounts. In its simplest form, this embodiment enables a transfer of funds between two FSPs to be carried out by a funds transfer between the FRB accounts of the two FSPs and some secure messaging, just as if funds were, in fact, transferred to the correspondence account held by one of the two FSPs.

FIG. 3 assumes that the buyer in a given transaction maintains an account called Buyer Acct in FSP2 and that the seller maintains an account in FSP1 called Seller's Acct. The ORGANIZATION (such as the FRB, for example) maintains a correspondence account called FSP2 ACCT for FSP2 and a correspondence account called FSP1 ACCT for FSP1. To transfer a payment from the buyer to the seller according to this embodiment of the present invention, the buyer's FSP FSP2 may debit the payment (and optionally a fee, as agreed upon by the parties) from the Buyer's Acct and may credit the payment to FSP2's own account (within FSP2), FSP 2 OWN ACCT, as shown at S31. A secure message may then be sent to the ORGANIZATION as shown at S32, instructing the ORGANIZATION to correspondingly debit the FSP2 ACCT correspondence account by the amount of the payment (and optionally a fee, as agreed upon by the parties) and correspondingly credit the payment to the FSP1 ACCT correspondence account, the account owned by the Seller's FSP FSP1 and held by the ORGANIZATION. This transfer between correspondence accounts is shown at S33. As shown at S34, the ORGANIZATION may then send a secure message to FSP1, advising FSP1 of the crediting of the payment to FSP1 ACCT, FSP2's correspondence account held by the ORGANIZATION. Upon receipt of the secure message from the FSP, FSP1 may then credit Seller's Acct as shown at S35, from its own account FSP 1 OWN ACCT, for example. Lastly, S36 calls for another secure message to be sent from FSP1 to FSP2, advising FSP2 that the payment has been transferred to Seller's Acct, thus completing the payment transfer from Buyer to Seller and the confirmation thereof to the buyer. Each of the secure messages, according to the present invention, may be followed by an acknowledgement from the recipient of the secure message to the sender thereof. Note that funds have effectively changed hands from the Buyer to the Seller without any money physically or electronically moving across institutional boundaries: the only transfers that occurred were within FSP2, within the ORGANIZATION or within FSP1. At some later time (or immediately), FSP1 and/or FSP2 may wish to transfer some or all of its finds on deposit with the ORGANIZATION to its own accounts, either singly or as a batch transaction. Such a transfer may be desirable should any of the correspondence accounts FSP1 ACCT and/or FSP2 ACCT accumulate an excess of funds, in the judgment of the owner of the correspondence account. In conventional fund transfers (such as FedWire, for example), normal settlement does not occur until some time after the seller's FSP FSP1 has received the actual transfer of funds, often incurring considerable delays and per-transaction expense. The Many-To-Many payment scheme disclosed herein changes this conventional mechanism of inter-FSP funds transfers in favor of a secure messaging-based settlement mechanism coupled with fast, low cost and secure intra-FSP funds transfers.

According to further embodiments of the present invention, Seller's Acct and/or Buyer's Acct may be, include or be tied to a credit card, a debit card, a bank card, a payment card or any other form of electronic money. The card issuing institution may, at its option, charge interest on negative balances and/or pay interest on positive balances in the Seller's Acct and/or the Buyer's Acct. The risk of fraudulent purchases and/or activity is minimal, as the identities of both the buyer and seller remain known by their respective FSPs. Every credit cad customer should be known to the issuing FSP if a credit, debit or any other card is to be used in conjunction with iDraft™ and/or the present invention. Smart cards to aid in establishing identity and in accomplishing authentication may also be advantageously employed within the context of the present invention. In all cases, the buyer's FSP preferably vouches for the buyer as a known client and the seller's FSP vouches for the seller, who is the recipient of the funds transfer (to prevent money laundering, for example).

Likewise, the ORGANIZATION may be or include a card issuing institution, such as a credit card company, for example. Preferably, cards are authenticated by a FSP if the transaction is over an amount set by agreement between the buyer and the FSP. According to a further embodiment of the present invention, the ORGANIZATION, as a card issuing institution, may hold correspondence accounts for all of the FSPs with which it does business. A buyer, in this manner, may make a purchase from a seller using a card from a card issuing institution with whom the buyer does not even have an account. For example, if the ORGANIZATION is a VISA® card issuing institution, the buyer may carry out a VISA® transaction, even though the buyer may not have a VISA® account, as the only transfer from the Buyer's Acct is to the FSP's own account (FSP 2 OWN ACCT in FIG. 3) and the only transfer to the Seller's Acct is from the seller's FSP own account (FSP 1 OWN ACCT in FIG. 3).

Alternatively, the seller's and the buyer's FSPs themselves may maintain the card issuing company's correspondence accounts. Indeed, FSP1 and FSP2 may each maintain a correspondence account for the card issuing institution, called the Card Issuing Institution Account or CIIA in FIG. 3. Although only one such CIIA is shown in FIG. 3 in each of FSP1 and FSP2, it is to be understood that each FSP may maintain such a CIIA correspondence account for each card issuing institution, such as VISA®, MASTER CARD® and the like. In this case, instead of FSP2 crediting the FSP 2 OWN ACCT with the payment debited from Buyer's Acct, the CIIA account at FSP2 may be credited with the payment debited from the Buyer's Acct, as shown at S31' in FIG. 3. A secure message may then be sent to FSP1 as shown at S36', instructing FSP1 to debit the CIIA in FSP1 and to correspondingly credit Seller's Acct, as shown at S35'. An acknowledgment may then be sent to FSP2, advising FSP2 and/or the Buyer of the completion of the transfer. Fees may be assessed at any stage of the above-described transaction, as agreed upon by the parties thereto. Note that this embodiment does not require the ORGANIZATION to maintain the correspondence accounts FSP1 ACCT and/or FSP2 ACCT, as the correspondence accounts are held by each of the FSPs FSP1 and FSP2 that are party to the transfer.

In like manner, each card issuing institution may (if allowed by the bylaws of the institution), according to the present invention, maintain correspondence accounts for each of the other card issuing institutions, thereby providing the Many-To-Many relationship between each of the card issuing institutions and enabling funds to be effectively transferred across the institutional boundaries of such card issuing institutions while moving only secure messages (and not funds) across those boundaries. Of course, when and if the CIIA correspondence accounts accumulate excessive finds, the owners of those accounts may decide to transfer all or a portion of those funds on deposit. Such transfers may be triggered by some event, such as a balance threshold or a specific interval, date and/or time of day, for example. In this manner, when a transfer of funds across institutional boundaries does occur, the transfer may represent a cumulative amount representative of many individual transactions, thus further decreasing the cost of transferring money.

The present invention is a payment mechanism and not a credit mechanism. Indeed, all credit must be secured outside of the Many-To-Many framework described herein. In this manner, the transfer of funds according to the present invention does not require credit checks and does not burden transactions with the risks inherent in extending credit. The card issuing institutions maintain their existing responsibilities regarding the management of cardholder's accounts, the authentication of the cardholder and the dissemination and protection of the cardholder's personal, financial and business information.

While the foregoing detailed description has described preferred embodiments of the present invention, it is to be understood that the above description is illustrative only and not limiting of the disclosed invention. Modifications may occur to those of skill in this art. Thus, the present invention to be limited only by the claims as set forth below.

What is claimed is:

1. A computer-implemented method of electronically transferring a payment to a seller having an account at a first Financial Service Provider (FSP) from a buyer having an account at a second FSP, the first FSP owning a first account at the first FSP and the second FSP owning a second account at the second FSP, the method comprising:

establishing a second correspondence account at the second FSP, the second correspondence account being owned by the first FSP;

receiving, at one or more computer systems associated with the second FSP, an encrypted electronic request from the buyer to transfer the payment from the buyer's account to the seller's account;

debiting the payment from the buyer's account and correspondingly crediting the payment to the second account with the one or more computer systems associated with the second FSP;

debiting the payment from the second account and correspondingly crediting the payment to the second correspondence account with the one or more computer systems associated with the second FSP;

generating a secure encrypted electronic message within the one or more computer systems associated with the second FSP to the first FSP advising the first FSP that the payment has been transferred to the second correspondence account and requesting that funds corresponding to the transferred payment be credited to the seller's account; and sending the secure encrypted electronic messages from the one or more computer systems associated with the second FSP to one or more computer systems associated with the first FSP.

2. The computer-implemented method of claim 1, further comprising debiting the payment from the first account and correspondingly crediting the seller's account upon receipt of the secure encrypted electronic message at the one or more computer systems associated with the first FSP.

3. The computer-implemented method of claim 1, further comprising establishing a first correspondence account at the first FSP, the first correspondence account being owned by the second FSP.

4. The computer-implemented method of claim 1, further comprising receiving an acknowledgment from the one or more computer systems associated with the first FSP at the one or more computer systems associated with the second FSP, the acknowledgment at least indicating receipt of the secure encrypted electronic message by the first FSP.

5. The computer-implemented method of claim 1, further comprising receiving an acknowledgment from the one or more computer systems associated with the first FSP at the one or more computer systems associated with the second FSP, the acknowledgment at least indicating that the payment has been credited to the seller's account.

6. The computer-implemented method of claim 1, further comprising assessing a fee with the one or more computer systems associated with the first FSP or the one or more computer systems associated with the second FSP from at least one of the buyer, the seller, the first FSP, and the second FSP.

7. The computer-implemented method of claim 1, wherein the buyer's account includes one of a credit, debit, FSP and payment card.

8. The computer-implemented method of claim 1, wherein the seller's account includes one of a credit, debit, FSP and payment card.

9. A computer-implemented method of transferring a payment to a seller having an account at a first Financial Service Provider (FSP) from a buyer having an account at a second FSP, the first FSP owning a first account at the first FSP and the second FSP owning a second account at the second FSP, the method comprising:

establishing a first correspondence account at the first FSP, the first correspondence account being owned by the second FSP;

receiving, at one or more computer systems associated with the second FSP, an encrypted electronic request from the buyer to transfer the payment from the buyer's account to the seller's account;

debiting the payment from the buyer's account and correspondingly crediting the payment to the second account with the one or more computer systems associated with the second FSP;

generating a secure encrypted electronic message within the one or more computer systems associated with the second FSP to the first FSP advising the first FSP to debit the payment from the first correspondence account and correspondingly credit the first account at the first FSP and to credit the payment to the seller's account; and sending the secure encrypted electronic message from the one or more computer systems associated with the second FSP to one or more computer systems associated with the first FSP.

10. The computer-implemented method of claim 9, further comprising establishing a second correspondence account at the second FSP, the second correspondence account being owned by the first FSP.

11. The computer-implemented method of claim 9, further comprising debiting the payment from the first correspondence account, correspondingly crediting the first account, and correspondingly crediting the payment to the seller's account upon receipt of the secure encrypted electronic message at the one or more computer systems associated with the first FSP.

12. The computer-implemented method of claim 9, further comprising receiving an acknowledgment from the one or more computer systems associated with first FSP at the one or more computer systems associated with the second FSP, the acknowledgment at least indicating receipt of the secure encrypted electronic message by the first FSP.

13. The computer-implemented method of claim 9, further comprising receiving an acknowledgment from the one or more computer systems associated with first FSP at the one or more computer systems associated with the second FSP, the acknowledgment at least indicating that the seller's account has been correspondingly credited.

14. The computer-implemented method of claim 9, further comprising assessing a fee with the one or more computer systems associated with the first FSP or the one or more computer systems associated with the second FSP from at least one of the buyer, the seller, the first FSP, and the second FSP.

15. The computer-implemented method of claim 9, wherein the buyer's account includes one of a credit, debit, FSP and payment card.

16. The computer-implemented method of claim 9, wherein the seller's account includes one of a credit, debit, FSP and payment card.

17. A computer-readable storage medium configured to store computer-executable code for electronically transferring a payment to a seller having an account at a first Financial Service Provider (FSP) from a buyer having an account at a second FSP, the first FSP owning a first account at the first FSP and the second FSP owning a second account at the second FSP, the computer-readable storage medium comprising:

code for establishing a second correspondence account at the second FSP, the second correspondence account being owned by the first FSP;

code for receiving, at the second FSP, an encrypted electronic request from the buyer to transfer the payment from the buyer's account to the seller's account;

code for debiting the payment from the buyer's account and correspondingly crediting the payment to the second account;

code for debiting the payment from the second account and correspondingly crediting the payment to the second correspondence account;

code for generating a secure encrypted electronic message to the first FSP advising the first FSP that the payment has been transferred to the second correspondence account and requesting that funds corresponding to the transferred payment be credited to the seller's account; and code for sending the secure encrypted electronic message to the first FSP.

18. The computer-readable storage medium of claim 17, further comprising code for debiting the payment from the first account and code for correspondingly crediting the seller's account upon receipt of the secure encrypted electronic message.

19. The computer-readable storage medium of claim 17, further comprising code for establishing a first correspondence account at the first FSP, the first correspondence account being owned by the second FSP.

20. The computer-readable storage medium of claim 17, further comprising code for receiving an acknowledgment from the first FSP, the acknowledgment at least indicating receipt of the secure encrypted electronic message by the first FSP.

21. The computer-readable storage medium of claim 17, further comprising code for receiving an acknowledgment from the first FSP, the acknowledgment at least indicating that the payment has been credited to the seller's account.

22. The computer-readable storage medium of claim 17, further comprising code for assessing a fee, the fee being assessed from at least one of the buyer, the seller, the first FSP, and the second FSP.

23. The computer-readable storage medium of claim 17, wherein the buyer's account includes one of a credit, debit, FSP and payment card.

24. The computer-readable storage medium of claim 17, wherein the seller's account includes one of a credit, debit, FSP and payment card.

25. A computer-readable storage medium configured to store computer-executable code for transferring a payment to a seller having an account at a first Financial Service Provider (FSP) from a buyer having an account at a second FSP, the first FSP owning a first account at the first FSP and the second FSP owning a second account at the second FSP, the computer-readable storage medium comprising:

code for establishing a first correspondence account at the first FSP, the first correspondence account being owned by the second FSP;

code for receiving, at the second FSP, an encrypted electronic request from the buyer to transfer the payment from the buyer's account to the seller's account;

code for debiting the payment from the buyer's account and correspondingly crediting the payment to the second account; and code for generating a secure encrypted electronic message to the first FSP advising the first FSP to debit the payment from the first correspondence account and correspondingly credit the first account at the first FSP and to credit the payment to the seller's account; and code for sending the secure encrypted electronic message to the first FSP.

26. The computer-readable storage medium of claim 25, further comprising code for establishing a second correspondence account at the second FSP, the second correspondence account being owned by the first FSP.

27. The computer-readable storage medium of claim 25, further comprising code for debiting the payment from the first correspondence account, code for correspondingly crediting the first account, and code for correspondingly crediting the payment to the seller's account upon receipt of the secure encrypted electronic message.

28. The computer-readable storage medium of claim 25, further comprising code for receiving an acknowledgment from the first FSP, the acknowledgment at least indicating receipt of the secure encrypted electronic message by the first FSP.

29. The computer-readable storage medium of claim 25, further comprising code for receiving an acknowledgment from the first FSP, the acknowledgment at least indicating that the seller's account has been correspondingly credited.

30. The computer-readable storage medium of claim 25, further comprising code for assessing a fee, the fee being assessed from at least one of the buyer, the seller, the first FSP, and the second FSP.

31. The computer-readable storage medium of claim 25, wherein the buyer's account includes one of a credit, debit, FSP and payment card.

32. The computer-readable storage medium of claim 25, wherein the seller's account includes one of a credit, debit, FSP and payment card.

* * * * *

UNITED STATES PATENT AND TRADEMARK OFFICE
CERTIFICATE OF CORRECTION

| | | |
|---|---|---|
| PATENT NO. | : 7,599,885 B2 | Page 1 of 1 |
| APPLICATION NO. | : 10/240366 | |
| DATED | : October 6, 2009 | |
| INVENTOR(S) | : Richard C. Johnson | |

It is certified that error appears in the above-identified patent and that said Letters Patent is hereby corrected as shown below:

On the Title Page, Item (73)
The Assignee should read as follows:
Oracle International Corporation, Redwood Shores, CA (US)

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,599,885 B2
APPLICATION NO. : 10/240366
DATED : October 6, 2009
INVENTOR(S) : Richard C. Johnson It is certified that error appears in the above-identified patent and that said Letters Patent is hereby corrected as shown below:

On the Title Page, Item (*) Notice: delete "1057 days" and insert -- 1725 days --.

On the Title Page, on page 2, Item (56) under "Other Publications", line 7, delete "Berkely," and insert -- Berkeley, --, therefor.

In column 2, line 14, delete "PSP," and insert -- FSP, --, therefor.

In column 3, line 59, delete "companys" and insert -- company's --, therefor.

In column 6, line 65, delete "modem" and insert -- modern --, therefor.

In column 8, line 22, delete "his" and insert -- This --, therefor.

In column 9, line 4, delete "finds" and insert -- funds --, therefor.

In column 10, line 21, delete "finds," and insert -- funds, --, therefor.

Signed and Sealed this

Seventh Day of September, 2010

David J. Kappos
*Director of the United States Patent and Trademark Office*